US011956602B2

(12) United States Patent
Reislhuber et al.

(10) Patent No.: US 11,956,602 B2
(45) Date of Patent: Apr. 9, 2024

(54) SIGNAL LEVEL DISPLAY FOR AN AUDIO DEVICE, AND AUDIO DEVICE

(71) Applicant: Robert Bosch GmbH, Stuttgart (DE)

(72) Inventors: Peter Reislhuber, Laberweinting (DE); Franz Lermer, Pilsting-Ganacker (DE)

(73) Assignee: Robert Bosch GmbH, Stuttgart (DE)

( * ) Notice: Subject to any disclaimer, the term of this patent is extended or adjusted under 35 U.S.C. 154(b) by 213 days.

(21) Appl. No.: 17/617,147

(22) PCT Filed: May 25, 2020

(86) PCT No.: PCT/EP2020/064371
§ 371 (c)(1),
(2) Date: Dec. 7, 2021

(87) PCT Pub. No.: WO2020/249378
PCT Pub. Date: Dec. 17, 2020

(65) Prior Publication Data
US 2022/0240037 A1 Jul. 28, 2022

(30) Foreign Application Priority Data
Jun. 11, 2019 (DE) ..................... 10 2019 208 464.8

(51) Int. Cl.
*H04R 29/00* (2006.01)
*H05B 45/10* (2020.01)
*H05B 45/20* (2020.01)

(52) U.S. Cl.
CPC ........... *H04R 29/008* (2013.01); *H05B 45/10* (2020.01); *H05B 45/20* (2020.01)

(58) Field of Classification Search
CPC ....... H04R 29/008; H05B 45/10; H05B 45/20
See application file for complete search history.

(56) References Cited

U.S. PATENT DOCUMENTS 5,099,210 A * 3/1992 Fortney ............ G01R 19/16542 324/435
8,773,028 B2 * 7/2014 Kubota .................. H05B 45/46 340/815.45

(Continued)

FOREIGN PATENT DOCUMENTS

DE 102005040261 A1 3/2007
GB 2560395 A 9/2018
JP 200194339 A 7/2000

OTHER PUBLICATIONS

Translation of International Search Report for Application No. PCT/EP2020/064371 dated Aug. 3, 2020 (2 pages).

*Primary Examiner* — Patrick F Marinelli
(74) *Attorney, Agent, or Firm* — Michael Best & Friedrich LLP

(57) ABSTRACT

The invention relates to a signal level display (2) for an audio device (1), comprising a first lamp (7) of a first color and a second lamp (8) of a second color, and comprising a control device (10) for controlling the lamps (7), (8) on the basis of a signal level to be displayed, wherein the control device (10) is designed to display the signal level in at least three stages by means of the lamps (7), (8), wherein the control device (10) is designed to control at least one of the lamps (7), (8) in such a way that, in order to display the different stages of the signal level, the lamp (7), (8) is operated in at least two different intensities not equal to zero.

13 Claims, 3 Drawing Sheets

(56) References Cited

U.S. PATENT DOCUMENTS

| | | | | |
|---|---|---|---|---|
| 9,144,131 | B2 * | 9/2015 | Wray | H05B 45/10 |
| 9,649,975 | B2 * | 5/2017 | Ehrlich | B60Q 1/305 |
| 10,368,408 | B2 * | 7/2019 | Kondo | C09K 11/7734 |
| 10,667,362 | B1 * | 5/2020 | Coetzee | H05B 45/39 |
| 11,172,559 | B2 * | 11/2021 | Shao | F21V 23/001 |
| 11,310,881 | B1 * | 4/2022 | Wu | H05B 45/37 |
| 11,317,485 | B2 * | 4/2022 | Mao | H05B 45/20 |
| 11,657,691 | B2 * | 5/2023 | Chen | F21S 9/03<br>315/154 |
| 2003/0039372 | A1 * | 2/2003 | Tsutsumi | H04S 1/007<br>381/107 |
| 2004/0170015 | A1 * | 9/2004 | Hamrick | G08B 7/062<br>362/812 |
| 2005/0008164 | A1 | 1/2005 | Kakishita | |
| 2007/0165406 | A1 * | 7/2007 | Wang | H05B 45/24<br>362/253 |
| 2013/0313972 | A1 * | 11/2013 | Hulett | H05B 45/20<br>315/121 |
| 2014/0197754 | A1 * | 7/2014 | Wray | H05B 45/37<br>315/217 |
| 2017/0048941 | A1 * | 2/2017 | Kondo | H05B 45/40 |
| 2017/0240101 | A1 * | 8/2017 | Ehrlich | B60Q 1/44 |
| 2019/0066456 | A1 * | 2/2019 | Clark | G01F 23/2966 |
| 2020/0337128 | A1 * | 10/2020 | Huang | H05B 47/175 |
| 2020/0396811 | A1 * | 12/2020 | Shao | F21V 23/001 |
| 2021/0029797 | A1 * | 1/2021 | Huang | H05B 45/20 |
| 2021/0136506 | A1 * | 5/2021 | Kikuhara | H03F 1/3264 |
| 2022/0007475 | A1 * | 1/2022 | Mao | F21V 23/0442 |
| 2022/0240037 | A1 * | 7/2022 | Reislhuber | H05B 45/20 |
| 2023/0010921 | A1 * | 1/2023 | Wu | H05B 45/397 |
| 2023/0284352 | A1 * | 9/2023 | Xu | H05B 45/20<br>315/291 |

* cited by examiner

SIGNAL LEVEL DISPLAY FOR AN AUDIO DEVICE, AND AUDIO DEVICE

BACKGROUND OF THE INVENTION

The invention relates to a signal level display for an audio device, wherein the signal level display comprises a first and a second lamp and a control device for driving the lamps.

Signal levels often need to be displayed at a plurality of devices including, in particular, in the professional audio field. These are in particular offered in, for example, the form of a VU meter. Such VU meters comprise, for example, lamps arranged next to one another or over one another, and indicate a signal level in accordance with the position of the lamp or the length of the illuminated segment.

The document DE 10 2005 040 261 A1, which is a good indication of the forthcoming prior art, describes an audio device, in particular a radio alarm clock, which is designed with controllable volume. The audio device comprises in this respect a display to indicate the volume level. This display here comprises, for example, lamps that can illuminate a different segment length.

It is to be noted that devices, including in particular devices in the audio field, are being constructed in increasingly compact form. It is often therefore difficult to be able to integrate display elements. In particular, it is often only possible to integrate display elements that permit a relatively coarse and/or undetailed indication.

SUMMARY OF THE INVENTION

The invention relates to a signal level display for an audio device. The invention further relates to an audio device. Preferred and/or advantageous embodiments of the invention emerge from the subsidiary claims, the description, and the appended figures.

A signal level display for an audio device is proposed. The signal level display is, for example, designed as a front display as a display element. Preferably the components of the signal level display are realized in a common component and/or embedded in a housing. The audio device is, for example, a radio alarm clock, a music player such as a CD or DVD player, a mixing desk or an amplifier. The audio device is used, for example, for the mixing, supply and/or replay of an audio signal, for example of music. For example, the input or output signal, in particular the audio signal, can be displayed by means of the signal level display, in particular its level, and most particularly its volume level.

The signal level display comprises a first lamp of a first color and a second lamp of a second color. The signal display can, furthermore, comprise more than two lamps, for example three, four or ten lamps. The first color is not the same as the second color. The lamps can form point-like lamps, or alternatively the lamps are designed as flat lamps. In particular, the first lamp and/or the second lamp can each be operated at different intensities, for example continuously controllable in intensity, or controllable in steps. The first and the second lamp and, in particular, the more than two lamps are preferably arranged in a common component, for example a housing. The first color and the second color are, in particular, located in the visible wavelength range, although parts of the wavelength spectrum can also lie in the invisible spectrum. The first and the second lamps and, in particular, the more than two lamps, are preferably arranged in such a way that the light radiated by the lamps is overlaid. By means of color mixing, very different colors can be generated by the overlay of the first and second colors and, in particular, the colors of the multiple lamps. The first and the second lamp and, in particular the more than two lamps, are preferably arranged located spatially directly adjacent to one another, while a radiation direction of the first lamp and a radiation direction of the second lamp and, in particular, the radiation directions of the more than two lamps are essentially the same or parallel.

The signal level display comprises a control device for driving the lamp on the basis of a signal level that is to be displayed. The control device is connected for this purpose to the first and the second lamp by means of signaling and/or energy, for example by means of wired connections. The control device can be designed as a power supply. In particular, the control device can comprise and/or be designed as a chip, microcontroller or processor. A signal level that is to be displayed is provided to the control device. The signal level that is to be displayed can, for example be a signal level of the audio signal, of the input or of the output signal of the audio device. The control device is, for example, here designed to regulate, adjust and/or to control the supply of energy and/or current to the lamps when driving the lamps. The signal strength or the volume level can, for example be displayed as the signal level; for example, whether a signal is present or a maximum value has been achieved can be used as the signal level.

The control device is designed to display the signal level in at least three steps by means of the lamps. The display can, for example, comprise whether a signal is present, whether a maximum value has been exceeded, and, as a third step, an intermediate value between presence and maximum value. In particular, the control device can be designed to display more than three steps, for example four, five or more than five steps, by means of the lamps, in particular with the first and the second lamp. It is in particular provided that the control device is designed to display the signal level in at least four, preferably five steps by means of only two lamps, the first and the second lamp.

The control device is designed to drive at least one of the lamps in such a way that this lamp is operated at different intensities to display the different steps of steps of the signal level. The control device can, in particular, operate the first and the second lamp at different intensities. Different intensities refers here in particular to a different operation of the current strength. A measure of the intensity can, for example, refer to the brightness or light flux of the lamp. The different intensities are in particular to be understood to mean that the different intensities each presuppose an operation, so that non-operation, or a current strength of zero is not to be understood as an independent intensity. If the intensity of zero were to be added, at least the intensities of lamp switched off, operating the lamp at a first current strength and operating the lamp at a second current strength greater than the first current strength would result.

The invention is based on the idea of operating at least one lamp at different intensities so that with two lamps at least three displayable steps can be obtained through color mixing. A mixing effect can, in particular, be used here.

It is preferred in particular that the control device is designed as a digital control device. For example the control device can be designed to output only an On or Off as the output signal, for example a constant voltage or current strength as on, and no current and/or voltage as off. This design is based on the consideration of being able to use a fail-safe control device that can be realized economically.

It is optionally provided that the control device comprises a plurality of controller outputs. For example the controller outputs are designed as wired interfaces. For example the same voltage and/or same current can be accessed and/or drawn at each of the controller outputs of a digital control device. The first and/or the second lamp can be supplied with current and/or voltage by means of the controller outputs. The at least one lamp operated at different intensities here is connected to and/or operated by at least two or more controller outputs. The drive of the lamp at different intensities can, for example, be done in that the controller outputs that are connected to this lamp are switched on in order in this way to increase the intensity, or are switched off to reduce the intensity in this way.

In particular it is provided that the connection between the intensity-controlled lamps and the control device is realized in wired form. The wired connections of different controller outputs to the lamps preferably here have different resistances. It is, for example, possible to arrange in this way that the same amount of current is not necessarily always supplied to the lamps by means of the control inputs, so that a finer gradation and/or drive of the lamp can also be achieved. In particular, connections comprise diodes as rectifiers, for example so that a flow of current with and/or through a connection with a lower resistance is avoided.

It is in particular preferred that the control device is designed to realize the steps of the signal levels through at least partial or permanent operation of lamps as light sources in a mixed operating mode or with a simultaneous operation. The control device is designed here to be able to display different signal levels through color mixing. For example, through adding red color into the mixture through operating a red or reddish lamp more strongly, a rise in the intensity in the signal level can be made known; or rather, a change to red can indicate risks or overdrive. This design is based on the idea that by mixing the colors of different lamps, in particular also in a stepped or digital operating mode, a stepped signal level display that is understandable for a user can be obtained. The user can understand or can be trained to be able to appropriately construe a change in the color profile.

The control device can, in particular, be designed to increase the intensity of the first lamp and/or to reduce the intensity of the second lamp in order to display the steps of the signal level. An increase in the intensity can, for example, be realized through a drive using higher currents. The second lamp can here also have its intensity increased or reduced to the same extent, or independently thereof. The increase or reduction in the intensity can be configured to be equidistant or linear, or alternatively jumps of different orders of magnitude can be realized by means of the control device when regulating the intensity. For example, regions that are particularly sensitive or which require particular attention, can thus be displayed more accurately or more effectively.

In particular it is provided that the control device is designed to drive the first and/or the second lamp in such a way that its intensity, or its driven current strength, has an extreme value. The extreme value further has and/or further determines a change in the monotonicity. A maximum value in the form of a maximum or a minimum value in the form of minimum refers, for example, to such an extreme value. The extreme value is, for example, a crest. It can, for example, be provided that the first lamp is driven, starting from a current strength zero to a current strength one and then to a current strength two, and then back to a current strength one, wherein current strength one is not equal to current strength two.

One embodiment of the invention provides that the control device is designed to display a minimum signal level as one step or step value and/or a maximum signal level as a step or step value of the signal level. A minimum signal level relates, for example, to whether a signal level, or sufficient drive of the audio device, is present at all. A maximum signal level indicates for example, overdrive or clipping. The control device is, for example, designed to indicate a minimum signal level through operation of the first or the second lamp alone. The control device can furthermore be designed to indicate the maximum signal level by driving or operating the second or first lamp alone, in particular the lamp that does not indicate the minimum signal level.

It is particularly preferred if the first and second lamps are designed as an LED or as an OLED. In particular, the first and second lamp can form a duo-LED. If the signal display comprises a plurality, and in particular three or more, lamps, these lamps can also form a common lamp or lamp unit. An RGB-LED can, for example, be used in which the three components R, G, B of the RGB-LED form the first, the second and a third lamp.

It is optionally provided that the color of the first lamp describes and/or defines a characteristic wavelength. The second LED or the second lamp further has a second characteristic wavelength. The characteristic wavelength can, for example, refer to the average wavelength. It is, for example, provided that the characteristic wavelength of the first lamp and of the second lamp differ by at least 80 nanometers, in particular at least 100 nanometers and, particularly preferably, at least 150 nanometers. For example, the first LED forms a red LED and the second LED a green LED, or vice versa. This configuration is based on the idea of enabling a most intuitively understandable and particularly easily recognizable system of steps possible of a signal level display.

One design of the invention provides that the signal level display comprises a third lamp. The third lamp preferably has a color that is not the same as the first and not the same as the second color. The control device is designed to display the steps of the signal level making use of the third lamp. The lamp can, for example, be operated at different intensities and/or added to the display in different proportions.

It is in particular provided that the signal level display forms a front display for an audio device. The front display is in particular designed as an interchangeable component, for example arranged in a housing, so that the front display in audio devices can be exchanged or replaced.

A further object of the invention forms an audio device for the output and/or mixing of an audio signal. For example the audio device is designed as an alarm clock, as a music player, for example a CD or DVD player. The audio device can furthermore be designed as a mixing desk or as an amplifier. The audio device comprises the signal level display as described earlier. The signal level display is in particular integrated into the audio device in the form of a front display. The signal level display is designed to display a signal level, for example a volume level of the audio device, for example at its signal input or signal output.

BRIEF DESCRIPTION OF THE DRAWINGS

Further advantages, effects and designs result from the appended figures and their description, in which.

DETAILED DESCRIPTION

Figure 1:
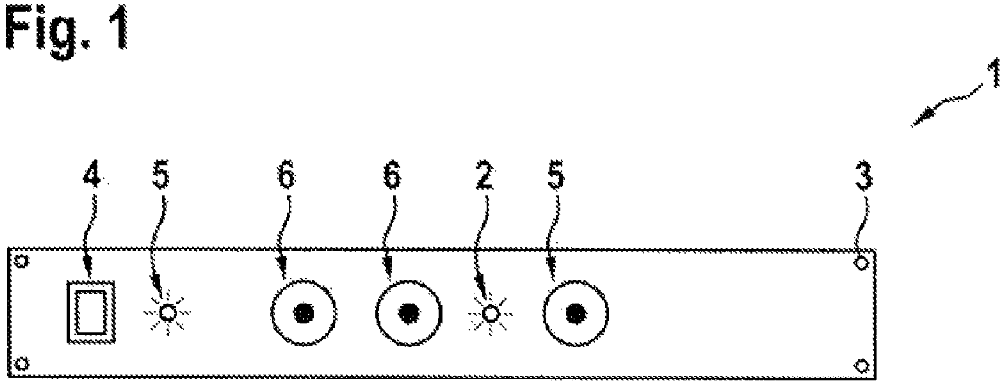
FIG. 1 shows a schematic embodiment of an audio device.

FIG. 1 shows, by way of example, an audio device 1 with a signal display 2.

The audio device 1 is, for example, an audio processor or a limiter. The audio device 1 can furthermore be designed as an amplifier, as a mixing desk or as a replay device. The audio device 1 shown here in the form of an audio processor or limiter has assembly holes 3, for example for mounting in a rack. It furthermore comprises an on/off switch 4 and an operating display 5. The operating display 5 is designed here as an LED, and serves to display whether the device is switched on or off. The audio device 1 further comprises two audio inputs 6 and one output 5. Audio signals can be made available at the audio inputs 6. The audio signals each have a signal level. A signal, for example an audio signal and, in particular, a mixed audio signal, can be accessed at the signal output 5.

The signal display 2 is designed here as a lamp. The lamp, or the signal level display 2, is designed to display a signal level in different steps, in particular at least three and in the present case in five steps. The signal level displayed can, for example, be the audio signal level at the audio output 5.

The user can establish from the color and/or intensity of the light radiated by the signal display whether a signal is present, whether it lies above the limit value, and can estimate in what region the signal level lies between the limit value and the lower limit.

FIGS. 2*a* to 2*e* show, by way of example, a realization of the signal level display 2. The signal level display 2, in particular as also shown in FIG. 1, comprises a first lamp 7 and a second lamp 8. The first lamp and the second lamp 7, 8 are designed as LEDs. The first and the second lamp are arranged as a duo-LED in a common housing 9. The first lamp is designed to emit light with a mean wavelength $\lambda_1$, while the second lamp is designed to emit light at a wavelength $\lambda_2$. The color of the first lamp is green, while that of the second lamp is red. In the surroundings of the signal level display, a wavelength km results, also referred to as the measured wavelength, resulting, for example, as a mixture. The first and/or the second lamp 7, 8, can be operated at different intensities I, wherein the intensity reflects, for example, the radiated power. To distinguish them, the intensities are identified as $I(\lambda_1)$ and $I(\lambda_2)$. The lamps 7 and 8 are driven by a controller or by a register/shift register, wherein these provide the necessary current. This controller serves here as the control device. The control device is designed to output a maximum current value, also referred to as the operating current value, wherein the operating current value for the lamp results in the intensity $I_0$.

Figure 2A:
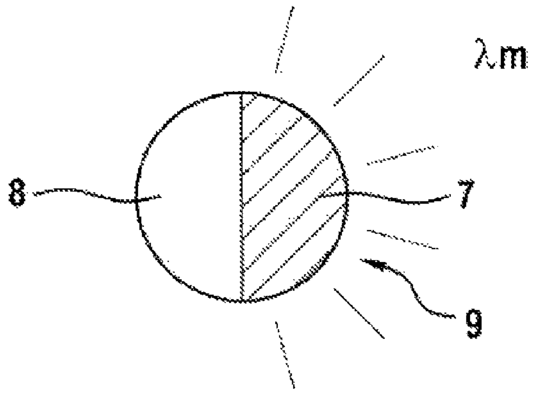
FIGS. 2*a*-2*e* show exemplary operating states of a signal display.

FIG. 2*a* shows the signal level display in a first operating state, where here the lamp 7 is driven and/or operated as the first lamp with the intensity $I_0$. This leads to a measured wavelength in the surroundings of $\lambda_m=\lambda_1$, and is perceived by the user as green. In a second operating state, illustrated in FIG. 2*b*, the first lamp 7 is operated with the intensity $2*I_0$. The first lamp 7 is, for example, operated for this purpose through and/or by means of two controller outputs. As in FIG. 2*a*, the second lamp 8 here is not supplied with current, and does not emit any light. Due to the higher current supplied to the first lamp 7, a brighter and/or more intense green is perceived by the user. This is the perceptible wavelength $\lambda_m$ in this case too.

Figure 2B:
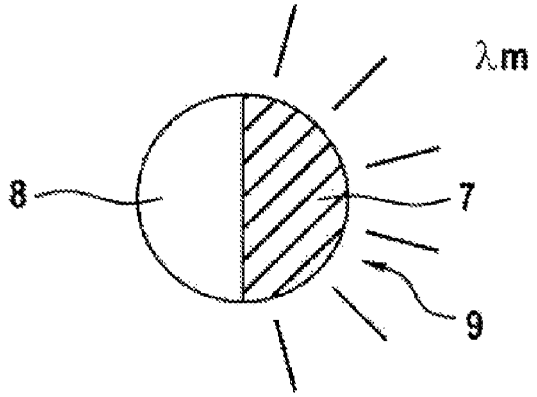
Figure 2C:
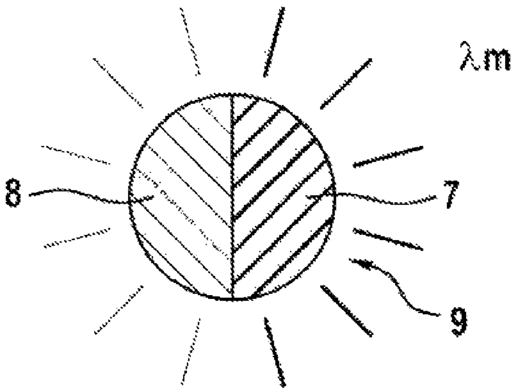

FIG. 2*c* shows a third operating state, in which the first lamp 7, as in FIG. 2*b*, is operated with the intensity $2*I_0$, and the second lamp 8 with the intensity $I_0$. A mixture of a highly intense green light with the wavelength $\lambda_1$ and of a less intense red component with $\lambda_2$ is thus generated by the signal level display. This is perceived by a user as a bright orange.

Figure 2D:
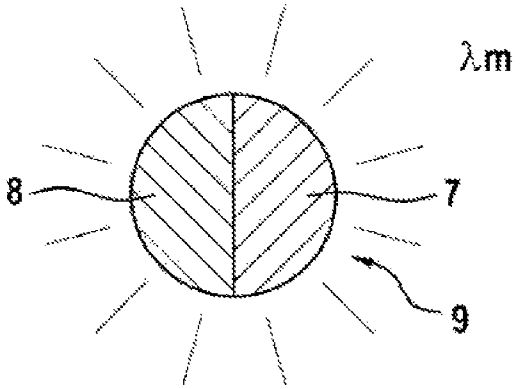

FIG. 2*d* shows a fourth operating state, in which both the lamp one 7 and the lamp two 8 are operated at the intensity $I_0$. An even mixture of green and red is thus perceived as $\lambda_m$ by the user. This operating state is interpreted by the user as a dark orange.

Figure 2E:
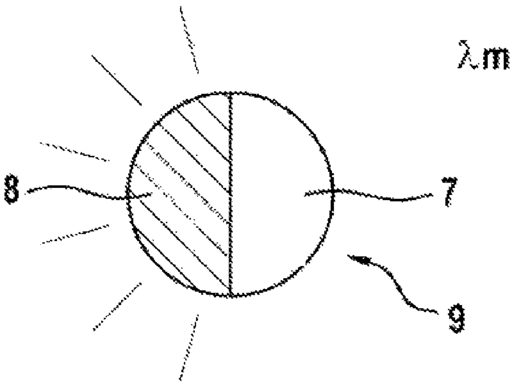

In a fifth operating state, FIG. 2*e*, the first lamp 7 is not operated and/or has no intensity, while the second lamp 8 is operated at the intensity $I_0$, so that $\lambda_m=\lambda_2$, and the user interprets this as red. A signal level can be displayed in five steps using the duo-LED through these different operating states, for example dark green, light green, dark orange, light orange and red.

Figure 3:
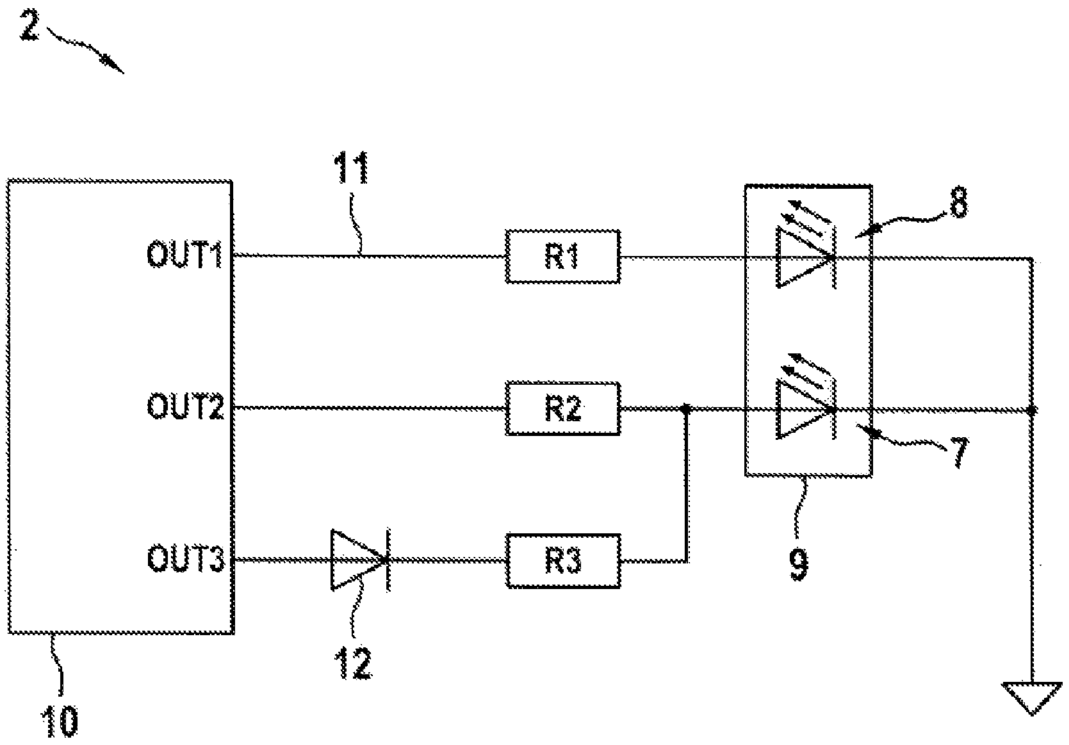
FIG. 3 shows an exemplary embodiment of a signal display.

FIG. 3 shows an exemplary embodiment of the signal level display 2. The signal level display 2 comprises the control device 10, the first lamp 7 and the second lamp 8. The first lamp 7 forms a green LED, and the second lamp 8 forms a red LED. The green and red LED are designed as a duo-LED. The lamps 7 and 8 are each connected by means of wired connections 11 to the control device 10. The second lamp 8 here is connected by means of a line 11, and has a resistance R1, while the first LED 7 has a split connection to the controller 10, so that an input of the second lamp is connected to two controller outputs, Out 2 and Out 3. The controller outputs OUT 1, OUT 2 and OUT 3 are digital outputs, and can each output either no current and/or voltage, or an equal current and/or voltage, which is understood as $I_0$. The control device 10 is designed to realize the stepped signal level display in such a way that, for example, the operating modes of FIGS. 2*a*-2*e* are achieved. For example, the realization of FIG. 2*a* can be achieved by driving the LED 7 by means of OUT 2 only. The operating state 2*b* can be achieved in that the LED 7 is supplied with current from the outputs OUT 2 and OUT 3, so that Jo is available twice to the lamp 7. To avoid undesirable reverse flow, in particular if R2 is not equal to R3, a diode 12 is arranged between the output and the LED. To realize the operating state 2*c*, the first LED 7 is driven by the two controller outputs OUT 2 and OUT 3, and the red LED 8, as the second lamp 8, is driven by the output Out 1. The operating state of FIG. 2*d* can be achieved in that the control device 10 is designed to drive the first lamp 7 by means of the controller output 2 and to switch off controller output 3, wherein the second lamp 8 is simultaneously driven by means of the controller output 1. The operating state of FIG. 2*e* can be obtained in that the first lamp 7 is not supplied with current, meaning that controller outputs 2 and 3 are switched off, wherein the second lamp 8 is operated with the intensity I1 coming from controller output 1.

The invention claimed is:

1. A signal level display (2) for an audio device (1), the signal level display comprising:

a first lamp (7) of a first color and a second lamp (8) of a second color, a control device (10) for driving the first and second lamps (7, 8) on the basis of a signal level to be displayed, wherein the control device (10) is configured to display the signal level in at least three steps via the lamps (7, 8), wherein the control device (10) is configured to drive at least one of the first and second lamps (7, 8) in such a way that the at least one of the lamps (7, 8) is operated at least two different intensities not equal to zero to display the different steps of the signal level, wherein the control device (10) is configured to display the steps of the signal level by mixing the colors of the lamps in operation, wherein a first connection connects the first lamp to a first controller output via a first resistor, a second connection connects the second lamp to a second controller output via a second resistor, and a third connection connects the second lamp to a third controller output via a diode and a third resistor, wherein the mixing of the colors of the lamps (7, 8) to produce the signal level output depends upon a first output from the first controller output through the first connection, a second output from the second controller output through the second connection, and a third output from the third controller output through the third connection, wherein the first intensity of the at least two different intensities comprises of producing a signal level output from the second output from the second controller output and the third output from the third controller output, and the second intensity of the at least two different intensities comprises of producing a signal level output from the second output from the second controller output.

2. The signal level display (2) as claimed in claim 1, wherein the control device (10) comprises a digital control device (10).

3. The signal level display (2) as claimed in claim 1, wherein the controller outputs (OUT 1-3) for drive a supply of current to the lamps (7, 8).

4. The signal level display (2) as claimed in claim 3, wherein wired connections to at least two of the plurality of controller outputs, and wherein wired connections have different electrical resistances (R1, R2, R3).

5. The signal level display (2) as claimed in claim 1, wherein the control device (10) is designed to raise the intensity of the first lamp (7) and/or to reduce the intensity of the second lamp (8) to display the steps of the signal level.

6. The signal level display (2) as claimed in claim 1, wherein the control device (10) is designed to drive the first and/or second lamp (7, 8) in such a way that its intensity has a value with a change in the monotonicity.

7. The signal level display (2) as claimed in claim 1, wherein the control device (10) is configured to display a minimum signal level through the drive and/or operation of the first lamp (7) alone and/or display a maximum signal level through the drive and/or operation of the second lamp (8) alone.

8. The signal level display (2) as claimed in claim 1, wherein the first and second lamps (7, 8) comprise LEDs.

9. The signal level display (2) as claimed in claim 1, wherein the first and second lamps (7, 8) form a duo-LED.

10. The signal level display (2) as claimed in claim 1, wherein the first color describes a first characteristic wavelength ($\lambda_1$) and the second color describes a second characteristic wavelength ($\lambda_2$), wherein the first and second characteristic wavelengths ($\lambda_1$, $\lambda_2$) are separated by at least 50 nanometers.

11. The signal level display (2) as claimed in claim 1, further comprising a third lamp for displaying the steps of the signal level, wherein the control device (10) is configured to drive the third lamp on the basis of the signal level.

12. The signal level display (2) as claimed in claim 1, wherein the signal level display (2) is configured as a front display for an audio device (1).

13. An audio device (1) for the output and/or mixing of an audio signal, the audio device comprising:

a first lamp (7) of a first color and a second lamp (8) of a second color, a control device (10) for driving the first and second lamps (7, 8) on the basis of a signal level to be displayed, wherein the control device (10) is configured to display the signal level in at least three steps via the lamps (7, 8), wherein the control device (10) is configured to drive at least one of the first and second lamps (7, 8) in such a way that the at least one of the lamps (7, 8) is operated at least two different intensities not equal to zero to display the different steps of the signal level, wherein the control device (10) is configured to display the steps of the signal level by mixing the colors of the lamps (7, 8) in operation to produce a signal level output, wherein a first connection connects the first lamp (7) to a first controller output via a first resistor, a second connection connects the second lamp (8) to a second controller output via a second resistor, and a third connection connects the second lamp (8) to a third controller output via a diode and a third resistor, wherein the mixing of the colors of the lamps (7, 8) to produce the signal level output depends upon a first output from the first controller output through the first connection, a second output from the second controller output through the second connection, and a third output from the third controller output through the third connection, wherein the first intensity of the at least two different intensities comprises of producing a signal level output from the second output from the second controller output and the third output from the third controller output, and the second intensity of the at least two different intensities comprises of producing a signal level output from the second output from the second controller output.

* * * * *